United States Patent [19]

Mahdjuri

[11] 4,122,831

[45] Oct. 31, 1978

[54] SOLAR COLLECTOR COMPRISING AN ELONGATE ABSORBER IN AN EVACUATED TRANSPARENT TUBE

[75] Inventor: Faramarz Mahdjuri, Aachen, Fed. Rep. of Germany

[73] Assignee: U.S. Philips Corporation, New York, N.Y.

[21] Appl. No.: 785,916

[22] Filed: Apr. 8, 1977

[30] Foreign Application Priority Data

Apr. 28, 1976 [DE] Fed. Rep. of Germany ....... 2618651

[51] Int. Cl.$^2$ ............................................... F24J 3/02
[52] U.S. Cl. .................................................. 126/271
[58] Field of Search ................................. 126/270, 271

[56] References Cited

U.S. PATENT DOCUMENTS

| 3,227,153 | 1/1966 | Godel et al. | 126/271 |
| 3,952,724 | 4/1976 | Pei | 126/271 |
| 3,990,430 | 11/1976 | Robertson | 126/270 |
| 4,027,653 | 6/1977 | Meckler | 126/270 |

Primary Examiner—Carroll B. Dority, Jr.
Attorney, Agent, or Firm—Frank R. Trifari; Rolf E. Schneider

[57] ABSTRACT

A solar collector comprising an elongate absorber centrally arranged in an evacuated, transparent, circular-cylindrical tube provided with a reflector in the form of a ½-circular cylinder in contact with the absorber.

8 Claims, 4 Drawing Figures

SOLAR COLLECTOR COMPRISING AN ELONGATE ABSORBER IN AN EVACUATED TRANSPARENT TUBE

This invention relates to a solar collector comprising an elongate absorber, including at least one duct for transferring heat derived from solar radiation incident on the absorber to a heat transport medium in the said duct during operation, the said absorber extending in the longitudinal direction of an enveloping, sealed and evacuated transparent tube which is provided, at least over a length portion of circular cross-section, with an internal reflector of arcuate cross-section, the absorber being arranged with its largest transverse dimension in the symmetry plane of the internal reflector.

A solar collector of the kind set forth is known from the magazine "Funkschau", 1975, No. 16, pages 19–20, notably FIG. 3.

The absorber of the known solar collector consists of a U-shaped tube whose plane which extends through the axes of the legs of the U is situated in the symmetry plane of the internal reflector between the longitudinal axis of the enveloping transparent tube and the said reflector. The internal reflector is provided over a region of at least 180° on the inner surface of the transparent tube.

Due to this asymmetrical construction, however, the manufacture of the relevant solar collector is rather difficult. Moreover, the provision of a reflective layer over half the inner surface of the cover tube is a time consuming and expensive operation. Furthermore, in this solar collector only part of the solar radiation is directly incident on the absorber, the major part of the radiation being reflected to the absorber by the internal reflector, so that reflection losses occur.

Moreover, if the tube is covered with a selective heat reflective layer above the internal reflector, as in the known solar collector, part of the heat radiation is reflected to the absorber only after multiple reflections on the internal reflector and on the selective heat reflective layer. Because any reflection involves losses, a comparatively high heat radiation loss is incurred.

The invention has for its object to provide a high-efficiency solar collector, which has a symmetrical and hence less costly construction and which includes an inexpensive internal reflector.

In order to realize this object, the solar collector in accordance with the invention is characterized in that the absorber is centrally arranged in the tube and in that the reflector engages the absorber, the reflector furthermore extending, in a cross-sectional view, through an angle of 120° or substantially 120° and intersecting the tube at points which are situated at the ends of the diameter (X—X) of the tube circle which extends perpendicularly relative to the reflector symmetry plane (Y—Y), the centre (M) of the circle of which the reflector arc forms part being situated on the reflector symmetry plane (Y—Y) such that the circle radii (R) extend through the reflector/tube points of intersection and are tangent to the absorber.

As a result of the central arrangement of the absorber in the enveloping tube with the largest absorber transverse dimension in the symmetry plane of the internal reflector, the portion of the solar radiation directly incident on the absorber is increased, particularly in the case of oblique incidence of radiation. Multiple reflections of the heat radiation prior to being incident on the absorber occur to a smaller extent, so that the heat radiation losses are comparatively low.

The shape of the internal reflector, a one-third circle cylinder, is substantially optimally adapted to the central arrangement of the absorber.

The internal reflector may consist of a flexible foil in accordance with the invention. The internal reflector can be effectively connected to the absorber. However, in a preferred embodiment, the internal reflector is resiliently arranged in the transparent tube.

In a further preferred embodiment of the solar collector in accordance with the invention, a flat reflector element is provided in the tube at each end of the tube length portion of circular cross-section, the said reflector elements extending transversely of the tube axis and also serving to keep the absorber in position relative to the tube.

Each such element may consist of a thin aluminium sheet or of mica with a vapour-deposited layer of aluminium or silver. These flat internal reflectors serve to reflect the heat radiation originating from the transparent tube and to reflect the solar radiation to the absorber in the case of oblique incidence of radiation.

A still further preferred embodiment of the solar collector in accordance with the invention is characterized in that the tube has dome-shaped end faces, the inner surface of at least one of which is provided with a reflective layer.

The reflective layer may consist of, for example, Al, Cu, Pb, Ag or Au and is obtained, after evacuation and sealing of the tube, by induction heating of quantity of metal provided on the respective flat reflector.

As a result of the heating, the metal evaporates and is deposited on the inner surface of the respective end face of the tube in the form of a reflective layer.

Another preferred embodiment of the solar collector in accordance with the invention is characterized in that the inner surface of the tube is provided with a light-transmitting but infrared reflective layer over at least the length portion of circular cross-section which is situated on the same side of the internal reflector as the absorber.

This layer may consist of, for example, gold, silver, tin dioxide or tin-doped indium oxide.

Still another preferred embodiment of the solar collector in accordance with the invention is characterized in that the absorber is provided with a surface layer of a material having an absorption factor $\alpha \geq 0.85$ for solar radiation and an emission factor $\epsilon \leq 0.3$ for heat radiation.

A selective absorbing layer of this kind may consist of, for example, nickel oxide, copper oxide or cobalt oxide on a metal substrate.

The invention will now be described in detail with reference to the accompanying drawings, in which.

Figure 1:
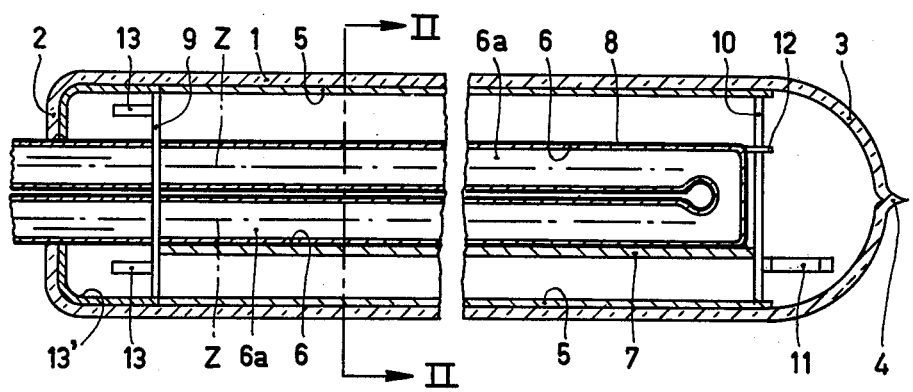
FIG. 1 is a longitudinal sectional view of an embodiment of a solar collector in accordance with the invention.

The reference numeral 1 in FIG. 1 denotes a transparent tube, in this case of glass, having dome-shaped end faces 2 and 3.

On the end face 3 there is a sealed-off pumping stem 4 wherethrough the interior of the tube 1 has been evacuated to a residual gas pressure of less than 1 mbar. The inner surface of the tube 1 is covered over the entire length of circular cross-section with a selective heat reflective layer 5 of tin-doped $In_2O_3$.

A tubular absorber 6 of glass or metal is sealed vacuum-tight centrally in the end face 2 of the tube 1, the said absorber having a U-shaped construction and comprising a duct 6a wherethrough a heat transport medium, for example, water to be heated by solar radiation can be conducted.

Figure 2:
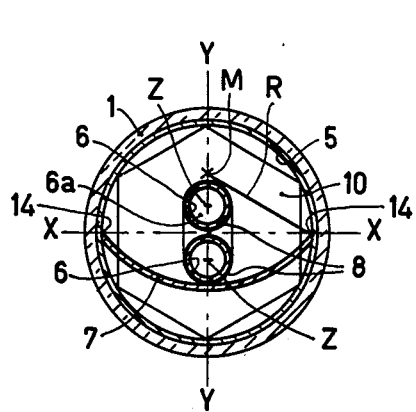
FIG. 2 is a cross-sectional view taken along the line II—II of FIG. 1.

The axes Z of the two legs of the U-shaped absorber 6 are situated, as appears from FIG. 2, in the symmetry plane Y—Y of an internal reflector 7 in the form of a thin flexible foil, for example, consisting of aluminium, or of a synthetic material or mica provided with a reflective layer of aluminium or silver, the length of the said foil corresponding substantially to that of the absorber 6.

In a cross-sectional view, the foil 7 is shaped as an arc of a circle extending over approximately 120°.

The foil 7 is loosely slid into the tube 1 and is retained therein in a resilient manner. It contacts the absorber 6 substantially linearly.

The absorber 6 is provided with a black surface layer 8 of, for example, glass enamel in the cylindrical portion of the tube 1.

The absorber 6 is secured in the tube 1 by way of two flat reflectors 9 and 10. These reflectors extend at the respective ends of the circular cylindrical region of the tube 1, transversely of the tube axis, and are made, for example, of mica with a vapour-deposited layer of aluminium. The reflector 10 carries a getter ring 11. A glass projection 12 which engages in the reflector 10 in a supporting manner is fused to the free end of the absorber 6.

In order to prevent heat losses at the end face 2, the reflector 9 carries quantities of metal 13, for example, aluminium, lead or copper.

After the tube 1 has been evacuated, it is subjected to external induction heating in the region of the metal quantities 13, so that the metal 13 evaporates and is deposited against the inner surface of end face 2 of the tube 1 in the form of a metallic reflective layer 13'. The evaporated metal is also deposited against the absorber tube 6 in the region between the reflector 9 and the end face 2. This is desirable to counteract radiation of heat by the absorber tube in this region.

As is shown in the cross-sectional view of FIG. 2, the arcuate foil 7, extending over a region of approximately 120°, intersects the tube 1 at points 14 which are situated at the ends of the diameter X—X of the tube circle 1, the said diameter being perpendicular to the symmetry plane Y—Y of the foil 7. The centre M of the circle of which the arcuate foil forms part is situated on the symmetry plane Y—Y such that the circle radii R extend through the points of intersection 14 and are tangent to the absorber 6.

In a practical solar collector, the outer diameter of the tube 1 amounted to 65 mm, the wall thickness to 1.2 mm, the overall length to 105 cm and the length in the circular cylindrical region between the reflectors 9 and 10 to 98 cm. The selective heat reflective layer 5 of tin-doped indium oxide had a layer thickness of 0.3 micron. The absorber 6 of glass had an outer diameter of 17 mm and a wall thickness of 1 mm. The absorber surface of black glass enamel had a thickness of 0.2 mm.

The internal reflector 7 with a length of also approximately 98 cm and a width of 7.7 cm consisted of an aluminium foil having a thickness of 0.1 mm.

Figure 3:
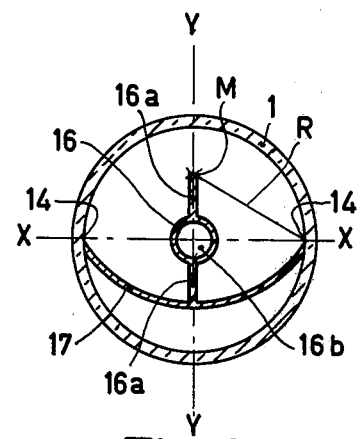
FIG. 3 is a cross-sectional view of a further embodiment of the solar collector.

The solar collector shown in FIG. 3 comprises an absorber 16 with flanges 16a which is completely made of metal and which is centrally sealed in the glass tube 1 in a vacuum-tight manner. The duct 16b serves for a heat transport medium which can discharge heat from the collector, if desired, by an evaporation/condensation process. The condensate can be returned to the absorber, if desired, by means of a capillary structure (not shown) provided on the walls of the duct 16b (heat pipe principle; see, for example, U.S. Pat. No. 3,229,759).

A thin internal reflector 17 is provided in the symmetry plane Y—Y, in which the flanges 16a extend. The lower flange 16a contacts the reflector 17.

The points of intersection 14 of the reflector 17 with the circular tube 1 are again situated at the ends of the diameter X—X which is perpendicular to the symmetry plane Y—Y of the arcuate reflector 17.

The centre M of the circle of which the arcuate reflector 17 forms part is again situated on the symmetry plane Y—Y such that the circle radii R extend through the points of intersection 14 and are tangent to the upper flange 16a of the absorber 16.

Figure 4:
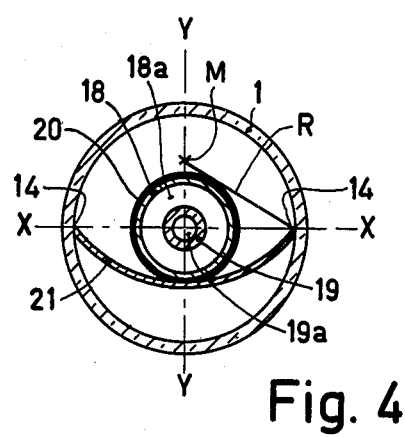
FIG. 4 is a cross-sectional view of a still further embodiment of the solar collector.

The solar collector shown in FIG. 4 comprises an absorber which consists of two concentric glass tubes 18 and 19 and which is centrally arranged inside the glass tube 1, the absorber being sealed in a vacuum-tight manner at one of the two ends (not shown) of the tube 1. The tube 18 is sealed at the other end of the tube 1, the tube 19 being open at this area. The duct 19a inside the tube 19 serves as a supply duct, and the annular duct 18a serves as a discharge duct for heat transport medium.

The tube 18 is covered on its outer surface by a selective layer 20 which readily absorbs solar radiation and which emits little heat radiation. The layer 20 is made, for example, of cobalt sulphide on a metallic substrate of, for example, silver.

The tube 1 again accommodates a thin arcuate reflector 21 which is constructed as a one-third circle cylinder and which contacts the absorber 18, 19.

The description given with reference to location of the centre M on the symmetry plane Y—Y of the circle including arcuate reflector 21.

What is claimed is:

1. A solar collector which comprises a sealed and evacuated transparent tube that has a circular cross-section over at least a portion of its length, an internal reflector having an arcuate cross-section of substantially 120° and extending substantially co-extensive with said length portion, and an absorber having at least one duct for transferring heat derived from solar radiation incident on the absorber to a heat transport medium in the duct during operation and extending longitudinally of said tube with its largest transverse dimension in the symmetry plane of said internal reflector, said absorber being centrally arranged in the tube, said reflector being in engagement with the absorber and intersecting the tube at points situated at the ends of the tube circle diameter perpendicular to the internal reflector symmetry plane, and the centre of the circle including the internal reflector arc being situated on the internal reflector symmetry plane such that circle radii extend through the reflector/tube points of intersection and are tangent to the absorber.

2. A solar collector according to claim 1, in which the internal reflector comprises a foil of flexible material.

3. A solar collector according to claim 2, in which the foil is connected to the absorber.

4. A solar collector according to claim 2, in which the foil is resiliently arranged in the tube.

5. A solar collector according to claim 1, in which at each end of the tube length portion of circular cross-section a flat reflector element extends transversely of the tube axis, said elements also serving to keep the absorber in position relative to the tube.

6. A solar collector according to claim 1, in which each end of the tube is dome-shaped and is provided with a reflective layer on its inner surface.

7. A solar collector according to claim 1, in which the inner surface of the tube is provided with a light-transmitting but infrared-reflective layer over at least the length portion of circular cross-section, said layer being situated on the same side of the internal reflector as the absorber.

8. A solar collector according to claim 1, in which the absorber is provided with a surface layer of a material having an absorption factor $\alpha \geq 0.85$ for solar radiation and an emission factor $\epsilon \leq 0.3$ for heat radiation.

* * * * *

UNITED STATES PATENT OFFICE
CERTIFICATE OF CORRECTION

Patent No. 4,122,831      Dated    October 31, 1978

Inventor(s)   FARAMARZ MAHDJURI

It is certified that error appears in the above-identified patent and that said Letters Patent are hereby corrected as shown below:

Col. 4, line 45, After "to" insert -- Figures 1-3   is also applicable to the --

Signed and Sealed this

Thirtieth Day of December 1980

[SEAL]

Attest:

SIDNEY A. DIAMOND

Attesting Officer     Commissioner of Patents and Trademarks